J. T. KEMPER.
Earth-Auger.
No. 164,460. Patented June 15, 1875.
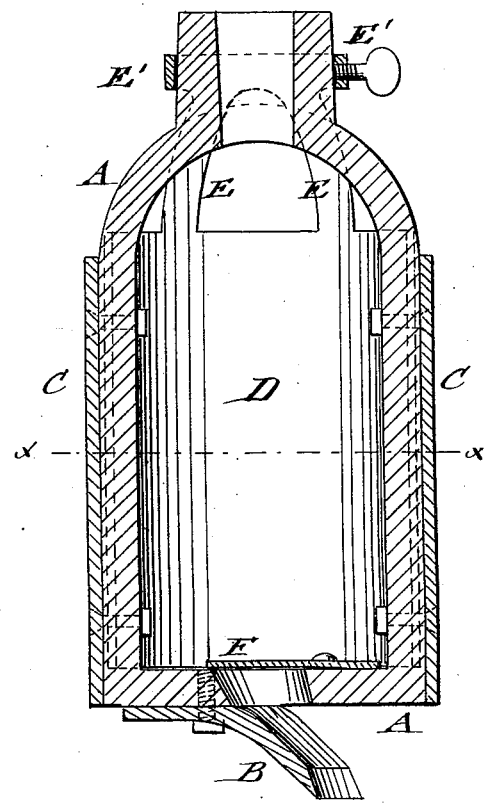
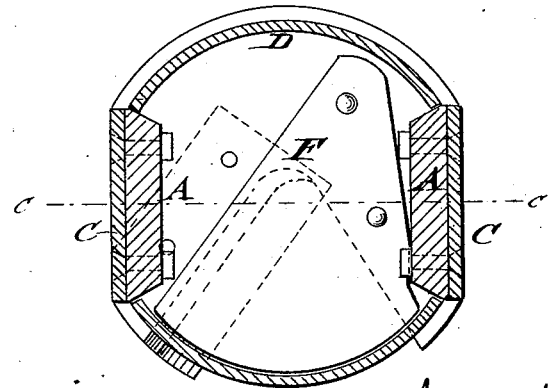

UNITED STATES PATENT OFFICE.

JOHN T. KEMPER, OF HANNIBAL, MISSOURI.

IMPROVEMENT IN EARTH-AUGERS.

Specification forming part of Letters Patent No. 164,460, dated June 15, 1875; application filed April 24, 1875.

*To all whom it may concern:*

Be it known that I, JOHN T. KEMPER, of Hannibal, in the county of Marion and State of Missouri, have invented a new and Improved Earth-Auger, of which the following is a specification:

In the accompanying drawing, Figure 1 represents a vertical central section of my improved earth-auger on the line $c\ c$, Fig. 2, and Fig. 2 is a horizontal section of the same on the line $x\ x$, Fig. 1.

Similar letters of reference indicate corresponding parts.

My invention relates to an improved earth-auger for boring wells in any soil or sand, being of strong, durable, and cheap construction; and it consists of a cast-iron auger pot or body with open sides, having outer reaming plates, and detachable cap sections that close the sides, and are attached to top by a set-screw.

In the drawing, A represents the main or body part of the auger, which is made of cast-iron, and applied by a square top socket to the end of the auger rod. The auger pot or body A, is open at the sides with its socket, sides, and bottom, being made in one piece. The bottom is provided with a throat for the entrance of the earth, sand, &c., cut by the bit B, bolted to the bottom below the throat. Steel plates C are bolted to the outer sides of auger, and serve as reamers to keep the hole smooth in either boring or drilling, and prevent also the auger or drill from getting fast. Sectional cap pieces D are slipped over the auger body, and fitted to close the open sides of the auger, being attached to arms E of a collar, E', that is firmly fastened by a set-screw to the top socket of the auger. A leather valve, F, is applied to the inside of the bottom of the auger to close the throat when lifted out. The cap and valve are only used in quicksand, and for taking out the drillings. The earth, gravel, &c., get packed sufficiently tight between the sides of the auger to be readily lifted out therewith.

Having thus described my invention, I claim as new, and desire to secure by Letters Patent—

1. An earth-auger for boring wells, &c., constructed of a pot or body with sockets, parallel sides, and bottom made of one piece of casting, and having steel-reaming face-plates attached to the sides, substantially in the manner and for the purpose set forth.

2. The combination of the auger body with the detachable cap section applied by supporting-arms, top collar, and set-screw, to close open side parts of auger, substantially for the purpose set forth.

JOHN T. KEMPER.

Witnesses:
 THOS. H. KING,
 GARY H. VAUGHN.